No. 758,464. PATENTED APR. 26, 1904.
H. L. ORR.
MINERAL SEPARATOR.
APPLICATION FILED SEPT. 1, 1903.
NO MODEL. 2 SHEETS—SHEET 1.
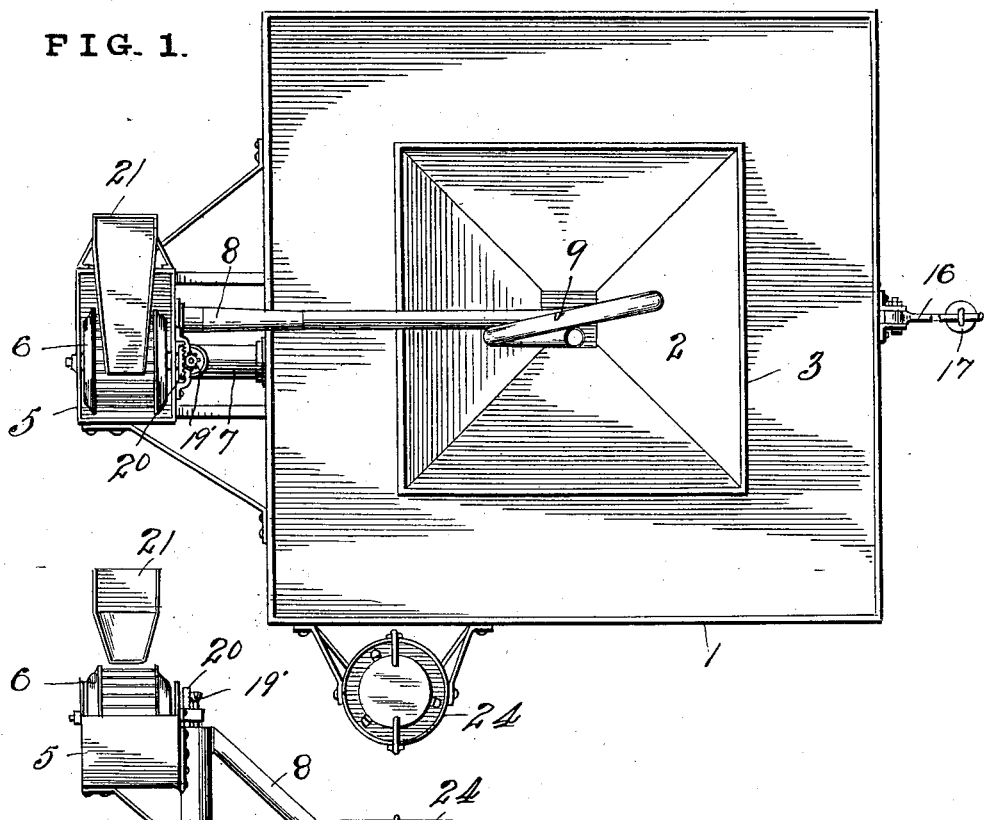
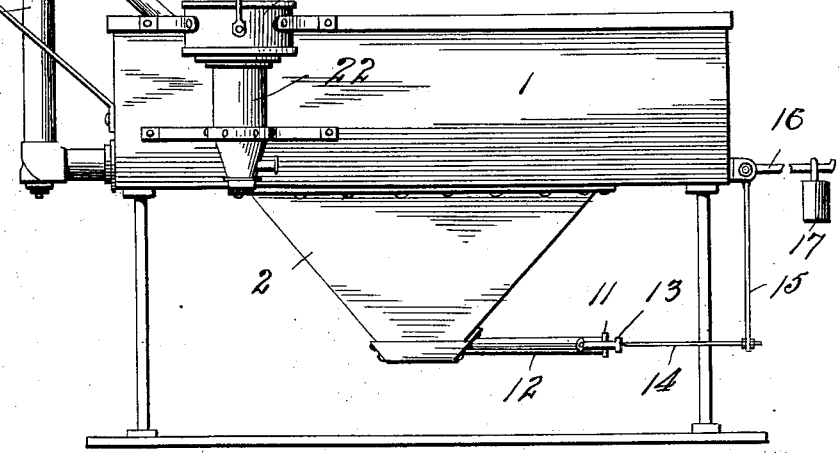

No. 758,464. PATENTED APR. 26, 1904.
H. L. ORR.
MINERAL SEPARATOR.
APPLICATION FILED SEPT. 1, 1903.
NO MODEL. 2 SHEETS—SHEET 2.
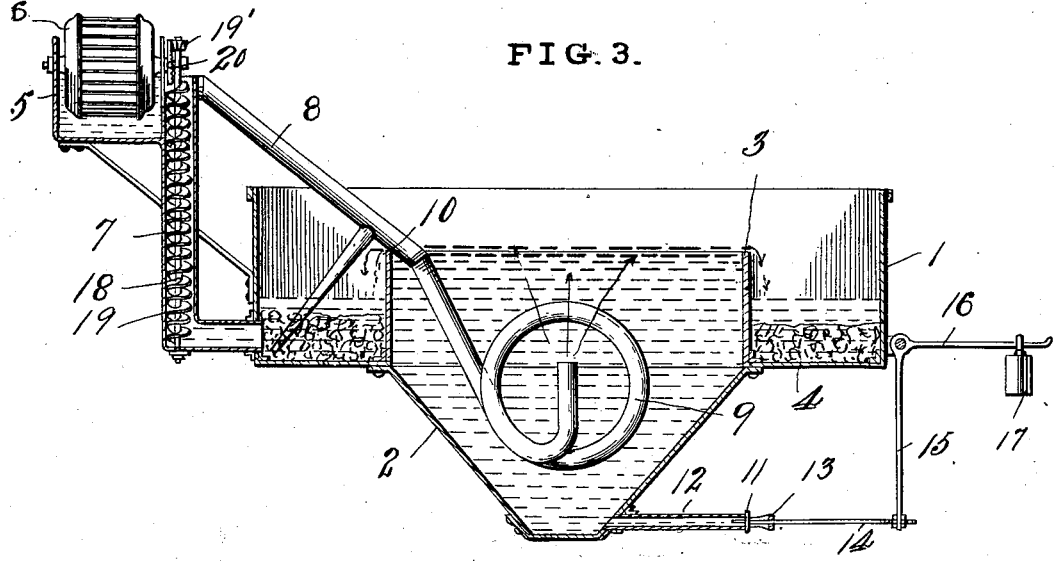
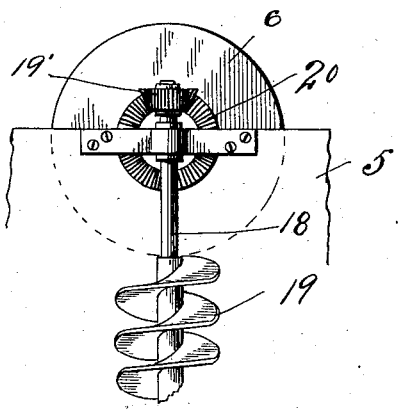
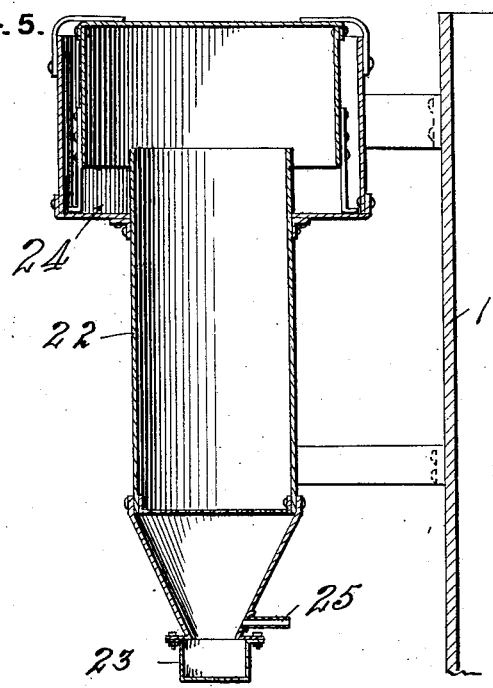
Witnesses
Chas. K. Davies
M. E. Moore
Inventor
Homer L. Orr
by Wm. N. Moore
Attorney No. 758,464. Patented April 26, 1904.

UNITED STATES PATENT OFFICE.

HOMER L. ORR, OF GREELEY, COLORADO.

MINERAL-SEPARATOR.

SPECIFICATION forming part of Letters Patent No. 758,464, dated April 26, 1904.

Application filed September 1, 1903. Serial No. 171,486. (No model.)

*To all whom it may concern:*

Be it known that I, HOMER L. ORR, a citizen of the United States, residing at Greeley, in the county of Weld and State of Colorado, have invented certain new and useful Improvements in Mineral-Separators, of which the following is a specification.

My invention relates to improvements in mineral-separators, and has for its object the provision of means for separating minerals of all kinds operated in conjunction with oils, chemicals, and filtration means and the handling of tailings of stamping-mills, &c.; also, to provide a cheaper and more perfect method acting continuously for the saving of flour-gold and other free minerals, and also means for saving every particle of mineral which has heretofore been wasted.

The invention consists in the novel features of combination and construction, as hereinafter described, and set forth in the claims. I attain these objects by the mechanism illustrated in the drawings, in which—

Figure 1 is a top view of the entire machine. Fig. 2 is a side view of the machine. Fig. 3 is a vertical sectional view of the machine as it appears in operation and supported by suitable framework resting on the ground. Fig. 4 is an enlarged detail view of the water-wheel and connections therefrom to work the pump. Fig. 5 is an enlarged sectional view of the smelter.

In the operation of my device I use oil or other suitable agent for the purpose desired in connection with water.

To carry out my invention, I provide a tank 1, provided with a tapering bottom portion 2 and having interior walls or partitions 3. These partitions form an inner separating tank or compartment within the large tank 1, the bottom of said inner tank being the tapered portion 2. As shown in the drawings, I place a sufficient quantity of material, as charcoal, (indicated at 4, Fig. 3,) to act as a filtering agent for the purpose to be described. Located at a suitable point I provide a smaller tank or receptacle 5, in which is journaled in suitable bearings a water-wheel, as 6, the blades of said wheel being placed at any predetermined distance apart to suit the particular circumstances under which the device is to be operated. The receiving-tank 5 is in communication with both compartments formed in the tank 1. A pipe or cylinder 7 connects the receiving-tank with the filtering or coil compartment, and pipe 8 leads from the receiving-tank into the larger inner receptacle of tank 1. Pipe 8 is provided with coil 9, having an upward opening in the end thereof, as clearly shown in the drawings. A siphon, as 10, is formed in the pipe 9, said siphon or pipe extending down into the filtration-tank for a purpose to be explained. To provide an outlet for an excess of water in the separation-tank 2, I locate an automatic valve 11 in the lower portion of said tank. The valve 11 is seated in a pipe 12, extending out from tank 2, and is guided in its movement by a bearing piece or arm 13, through which passes the valve-stem 14. At its outer end the stem 14 is adjustably secured (as shown in this instance by two nuts, the end of said stem being suitably screw-threaded therefor) to the pivoted lever-arm 15, one arm of which, as 16, is adapted to carry a weight 17.

In the pipe or cylinder 7 I provide a pump or other means for returning the oil to the receiving-tank. Said pump in this instance consists of a shaft 18, having thereon a continuous spiral blade 19, adapted to lift the water from the bottom of the pipe 7 to the top thereof, where it will run into the receiving-tank 7. To revolve the shaft 18, I provide a gear-wheel 19', which is adapted to mesh with another gear-wheel, 20, journaled on the shaft or axle of the water-wheel 6 and adapted to revolve therewith. Then when the device is in operation the water and other materials flowing from the sluice-box 21 or other entrance-point turns said wheel, and with it, through the connections named, the shaft 18.

To further complete the procedure of my invention, I provide a smelter which is attached to the tank 1 and the operation of which will be explained hereinafter.

The operation of my device is as follows: Water, sand, and minerals flow down the sluice-box, passing over the overshot water-wheel, turn said wheel on its shaft, at the same time operating the pump. The height of the receiving-tank is so adapted that with a predetermined space between the blades of the water-wheel the coarse gravel and boulders which are too large to pass between the blades of the wheel pass over the edge of the receiving-tank and fall to the ground, while the finer gravel, sand, and mineral and water drop through the blades of the wheel into the receiving-tank. Oil is present in the receiving-tank where it has been lifted from the filtration-tank by the pump operated by the movement of the water-wheel, and said oil is mixed in the receiving-tank with the incoming water containing the sand and minerals. When the mixed water and oil have reached a point high enough in the receiving-tank, they run off, carrying with them the mixed sand and minerals down through the pipe 8, passing siphon 10, and by suction lift the oil from the bottom of the filtering-tank into pipe 8, where the oil is mixed with the other materials, which on reaching spiral 9 are forced around said spiral and given an upward shoot, which assists the natural tendency of the oil to come to surface. This surface of oil and water (the oil being on top) is held to a perfect level at the top of tank 2 by means of the automatic valve 11 on the side of the tank, adjusted by a predetermined weight equally balancing the pressure of the contents of tank 2. The oil being on top flows over the partitions 3, carrying with it the minerals, and the water, gravel, and sand are disposed of through the pipe 12 and valve 11. The oil flowing over the partitions 3 falls onto the charcoal or other filtering agent in the compartment 1, where the minerals are caught by the charcoal and the oil percolates through the charcoal, and after being cleansed finds its way to the bottom of pipe 7, where it is lifted into the receiving-tank to again be carried down through pipe 8 and used again. The filtered oil is also lifted by suction through siphon 10 into pipe 8. When a "clean-up" is desired, the charcoal which has become saturated with the minerals and other filtering material is gathered up from the filtering-tank and placed in the attached retort or smelter 22 and ignited and burned, the major portion of the mineral falling to the bottom of the smelter and into a receptacle 23 and the balance going off into smoke. This smoke is made to pass through a chemical solution in chamber 24 before escaping to the air, by which process every atom of the mineral is saved. A common blower is attached to the bottom of the smelter at tube 25 to furnish a blast to facilitate combustion and to force the smoke through the chemicals in chamber 24. In this chemical solution in chamber 24 are deposited suitable metals, (according to the mineral or minerals to be saved,) upon which is precipitated all mineral contained or secured from the operation by my separating apparatus.

What I claim is—

1. In a mineral-separator, a receiving-tank, a wheel therein operated by inflowing water, a separating-tank and a filtering-tank communicating as described, a pipe having a pump located therein operated by said wheel for returning filtered oil to the receiving-tank from the filtering-tank, and a counterbalanced valve located in the separating-tank operated by excess pressure in said separating-tank to dispose of the unfiltered residue, combined substantially as described.

2. In an apparatus as described a receiving-tank a water-wheel therein operated by the incoming water and having blades or paddles disposed so as to pass the fine material and throw off the coarser material from the inflow from the sluice-box; a filtering-tank, a separating-tank, each said tanks communicating with the receiving-tank, and means for returning filtered liquid to the receiving-tank, substantially as described.

3. In a mineral-separator the combination of a receiving-tank, a separating-tank, a filtering-tank, a pipe or vessel connecting the filtering-tank and the receiving-tank having therein a shaft provided with spiral blades, and means located in the receiving-tank and driven by the inflowing water for operating said shaft to return the filtered liquid to the receiving-tank, substantially as described, and a feed-pipe from the receiving-tank to the separating-tank.

4. The combination of a receiving-tank, a filtering-tank and a separating-tank, a water-wheel in the receiving-tank adapted to separate to a predetermined degree from the inflowing water the mineral and other substances to be separated, a pipe or vessel connecting the filtering-tank and the receiving-tank having therein a shaft provided with spiral blades for returning the filtered liquid from the filtering-tank to the receiving-tank, said shaft being suitably connected to and driven by said wheel, and an outlet from the receiving-tank to the separating-tank.

5. In a mineral-separator, a receiving-tank, a wheel therein operated by inflowing water, a separating-tank and a filtering-tank, a pipe connecting the filtering-tank with the receiving-tank and having therein a shaft with spiral blades and means operated by said wheel for operating said shaft to return the filtered oil to the receiving-tank, an inflow-pipe from the receiving-tank to the separating-tank, having a coil therein and a mouth for projecting the inflowing water and material to the separating-tank, and a counterbalanced valve located in the separating-tank operated by excess pressure therein to dispose of the unfiltered residue.

6. The combination in a mineral-separator, of a receiving-tank, a separating-tank, an outlet-pipe from the receiving-tank extending into the separating-tank and having a coil at its lower end, a filtering-tank having communication with the receiving-tank, and a pipe extending from the outlet-pipe into the filtering-tank forming a siphon, whereby the material to be separated is fed from the receiving to the separating tank, and the filtered separating agent returned to the receiving-tank for repeated use, and a valve in the separating-tank for disposing of the unfiltered residue.

7. The combination in a mineral-separator, of a receiving-tank, a separating-tank, an outlet from the receiving-tank extending into the separating-tank, a filtering-tank having communication with the receiving-tank, and a pipe extending from the outlet-pipe into the filtering-tank forming a siphon; whereby material to be separated is fed from the receiving to the separating tank and the filtered separating agent returned to the receiving-tank.

8. In an apparatus as described, a receiving-tank having a pipe leading from the receiving-tank and provided with a coil near its end for projecting the inflowing material into a separating-tank; said separating-tank, and a filtering-tank, a pipe connecting the filtering and receiving tanks a shaft journaled therein, blades on said shaft as described and a gear-wheel; a water-wheel in the receiving-tank, a gear-wheel on its shaft engaging the gear-wheel on the pump-shaft, whereby the pump is operated to return filtered liquid from the filtering-tank to the receiving-tank, and means for disposing of the unfiltered residue from the separating-tank, all combined substantially as described.

In testimony whereof I affix my signature in presence of two witnesses.

HOMER L. ORR.

Witnesses:
EDWARD P. HOUSE,
RUTH C. MOORE.